United States Patent [19]
Foster et al.

[11] Patent Number: 5,918,181
[45] Date of Patent: Jun. 29, 1999

[54] METHOD AND APPARATUS FOR TRACKING LOCATION OF WIRELESS TERMINALS IN A NANOCELLULAR DIGITAL CORDLESS TERMINAL NETWORK COUPLED TO A LOCAL EXCHANGE

[75] Inventors: Theresa A. Foster, Los Gatos; Douglas Lau, Hillsborough, both of Calif.

[73] Assignee: Tatung Telecom Corporation, Mountain View, Calif.

[21] Appl. No.: 08/730,590

[22] Filed: Oct. 15, 1996

[51] Int. Cl.$^6$ ............................................. H04Q 7/38
[52] U.S. Cl. ..................... 455/456; 455/445; 455/462; 455/561
[58] Field of Search ............................. 455/456, 436, 455/445, 561, 461, 557, 31.2, 462; 379/211

[56] References Cited

U.S. PATENT DOCUMENTS

| | | | |
|---|---|---|---|
| 4,209,787 | 6/1980 | Freeny, Jr. | 342/457 |
| 4,658,416 | 4/1987 | Tanaka | 455/417 |
| 4,752,951 | 6/1988 | Konneker | 379/211 |
| 4,775,997 | 10/1988 | West, Jr. et al. | 455/557 |
| 4,876,708 | 10/1989 | Saegusa et al. | 455/462 |
| 4,893,336 | 1/1990 | Wuthnow | 379/211 |
| 5,090,051 | 2/1992 | Muppidi et al. | 455/410 |
| 5,151,929 | 9/1992 | Wolf | 455/31.2 |
| 5,315,636 | 5/1994 | Patel | 455/461 |

OTHER PUBLICATIONS

Marketing Brochure, "DCT–212 Digital Cordless Communication System," Mar. 1996.

*Primary Examiner*—Willis R. Wolfe
*Assistant Examiner*—Hieu T. Vo
*Attorney, Agent, or Firm*—Townsend and Townsend and Crew LLP

[57] ABSTRACT

A method and apparatus provide for operating and locating a digital cordless telephone (DCT) handset among an integrated network of base stations. The present system utilizes a standard communication protocol to establish radio communication links between terminals and a network of base stations, where each base station is directly interfaced to a local exchange and is capable of providing access to the public and/or private telephone network. Each base station is a network node that contains a copy of a common database that may be updated, as needed, to provide current information on the location of individual terminals. The common database contains various information on each base station, each terminal, and the latest location of each terminal at a particular base station. Further, with the temporary attachment and use of a computer to a master base station in the network, the DCT system is capable of using the common database to register terminals, locate terminals, and allocate communication channels between terminals and base stations.

18 Claims, 5 Drawing Sheets

METHOD AND APPARATUS FOR TRACKING LOCATION OF WIRELESS TERMINALS IN A NANOCELLULAR DIGITAL CORDLESS TERMINAL NETWORK COUPLED TO A LOCAL EXCHANGE

BACKGROUND OF THE INVENTION

The present invention relates to a digital cordless terminal or telephone (DCT) system in a limited-sized area, such as an office, factory, or the like. In particular, the invention provides a method and apparatus for operating and locating a DCT handset among an integrated network of base stations.

A single cordless terminal or handset for use with a single radio base station connected to telephone wiring installed in a wall is commonly found in a household or an office. Also, cordless phones operating with multiple radio base stations, where all base stations are directed by a common controller, have been used in a limited-sized area larger than a household or office. In such systems, all telephone line traffic and control signals from base stations are processed through a control hub, the common controller, which connects to a local exchange. The centralized controller is responsible for the switching interface, in addition to control features. If the common controller experiences problems, the entire system may be disabled, leading to impaired or even non-operational telephone service.

Accordingly, it is economical and desirable to have an integrated network of radio base stations with direct telephone line interface and decentralized control for use in limited-sized areas.

SUMMARY OF THE INVENTION

According to the invention, a method and apparatus provide for operating and locating a DCT handset among an integrated network of base stations. Each handset is configured to communicate with any one of the networked base stations within a two-way signal range. In a specific embodiment, each base station has a range of up to 3,000 square meters in enclosed space, and up to 100,000 square meters in open space. The DCT system accommodates multiple wireless handsets that may be located anywhere around a facility floor, with each base station capable of supporting, within its signal range, telephone line communication for as many telephone lines are directly interfaced to the base station. In a preferred embodiment, each base station has the capability of addressing any of 96 handsets and supporting up to two simultaneous telephone lines.

The present system utilizes a standard communication protocol to establish two-way radio communication links between handsets and a network of base stations, with each base station (directly interfaced to a local exchange) capable of providing access to and from a public and/or private telephone network and of transferring calls. Each base station is a network node that contains a copy of a common database that may be updated, as needed, to provide current information on the location of individual handsets. The common database contains various information on each base station, each handset, and the latest location of each handset at a particular base station. Further, with the temporary attachment and use of a computer to the network, the DOT system is capable of being easily configured to use the common database to register handsets, locate handsets, and allocate communication channels between handsets and base stations.

DESCRIPTION OF SPECIFIC EMBODIMENTS

Figure 1:
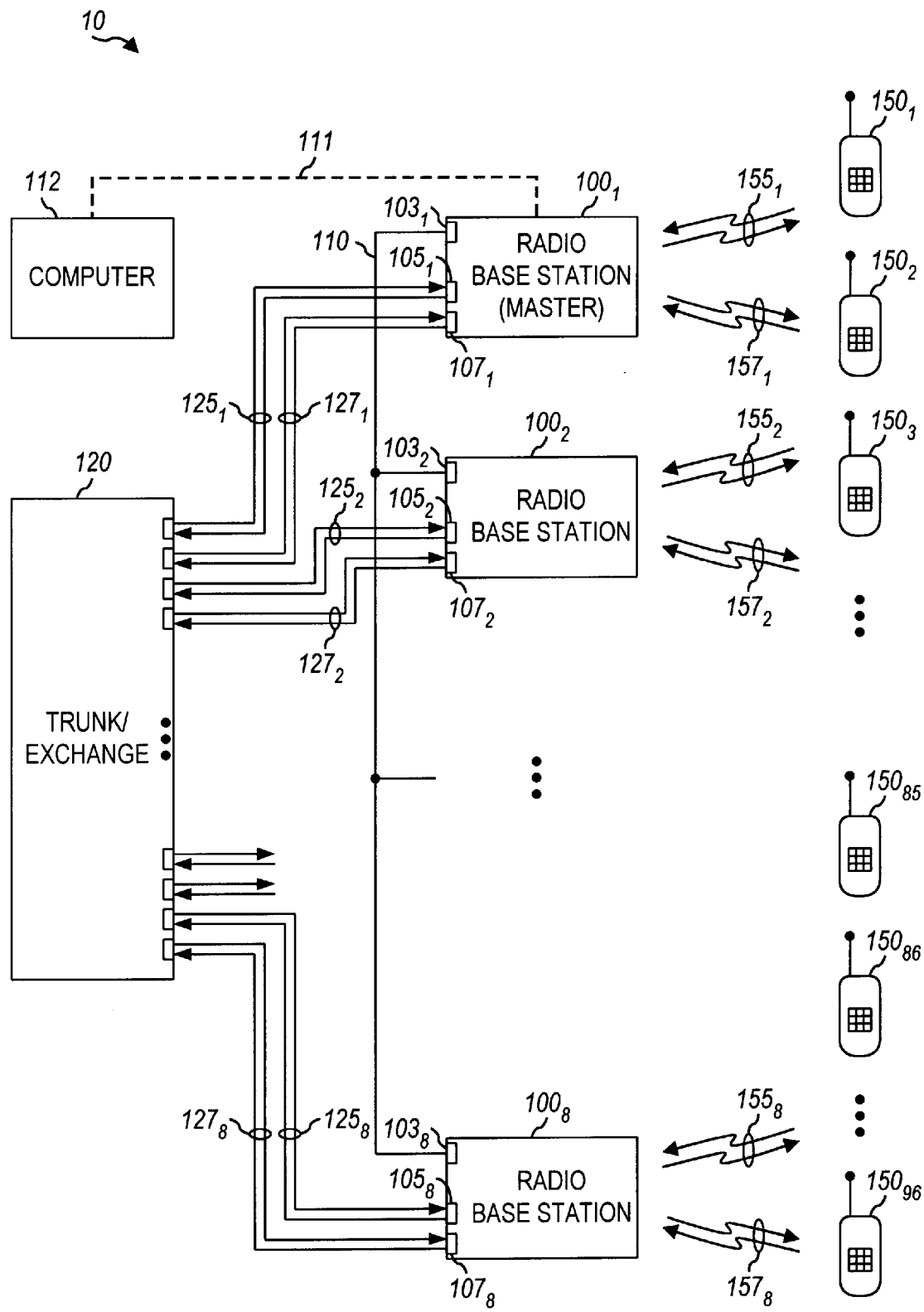
FIG. 1 is a general block diagram of an architecture for a DCT system according to an embodiment of the invention.

The present invention provides an integrated network system of base stations and DCT handsets that is suitable for use in a limited-sized area, such as a large office, factory, department store, or other like area. FIG. 1 is a block diagram of an architecture for a DCT system 10 according to an embodiment of the invention. As seen in FIG. 1, DCT system 10 includes a plurality of radio base stations $100_x$, where x may range from 1 to 8 in the present embodiment. Of course, other embodiments may provide for more base stations. An exemplary base station $100_x$ is described in greater detail below. According to a specific embodiment, each base station in the present DCT system has a total range of over about 3,000 square meters in heavily enclosed office space or up to 100,000 square meters in an open environment.

Each base station $100_x$ includes a bus port $103_x$, and at least two wired communication ports $105_x$ and $107_x$. Each bus port $103_x$ forms a node of a polled bus network 110. In a specific embodiment, each bus port $103_x$ of base station $100_x$ may be an RS-485 port, or other suitable connection to polled bus network 110. According to an embodiment, bus network 110 is a tri-state bus using a twisted pair. Each base station may be coupled via a suitable connection 111 (indicated by the dotted line), such as an RS-232 cable, to a computer 112, which temporarily attaches to a base station to provide input for system management, network programming, installation, database management, and troubleshooting. Each of wired communication ports $105_x$ and $107_x$ provides a telephone line and is coupled to respective ports of a local exchange system or trunk 120 via respective twisted pair cabling $125_x$ and $127_x$. Local exchange system 120 is a private branch exchange (PBX) according to a specific embodiment, but may of course be a public switched telephone network (PSTN), or other switching equipment capable of transferring calls from one extension number to another.

In the specific embodiment, each of twisted pair cablings $125_x$ and $127_x$ consists of a two-wire twisted pair to provide analog telephone communication for each respective telephone line between exchange 120 and a base station $100_x$. In other embodiments, each of twisted pair cablings $125_x$ and 127may consist of a twisted pair dedicated to the transmit direction and a twisted pair dedicated to the receive direction, to provide full-duplex, four-wire digital communication for each respective telephone line between exchange 120 and a base station $100_x$. Accordingly, each base station $100_x$ has two telephone lines $125_x$ and $127_x$ directly connected to local exchange 120 in the present embodiment. The present embodiment provides the capability for operation of up to sixteen telephone lines simultaneously. Of course, it is recognized that each base station $100_x$ may be configured with additional telephone lines for connection to local exchange 120 in other embodiments providing even more telephone lines.

As seen in FIG. 1, each base station $100_x$ also includes a two-way wireless communication port for each telephone line provided from exchange 120. Each wireless communication port that supports a radio communication link $155_x$ or $157_x$ is a multiple-access wireless base station node. According to the present embodiment, each base station $100_x$ is capable of operating with any two of the multiple wireless digital terminals $150_y$, and may support two simultaneous telephone lines. DCT system 10 supports multiple wireless digital terminals (handsets) $150_y$, where y may range from 1 to 96 in the present embodiment. Of course, additional wireless terminals may be supported in other embodiments.

Each battery-operated, wireless digital terminal $150_y$ is configured to communicate with any one of base stations $100_x$ within a two-way signal range. As mentioned above, each base station $100_x$ has a range of up to 3,000 square meters in enclosed space, and up to 100,000 square meters in open space. The signal range for a radio communication link depends on the power and properties of the antenna used. DCT system 10 accommodates multiple wireless handsets that may be located anywhere around the factory floor, with each base station $100_x$ capable of supporting, within its signal range, telephone line communication for as many telephone lines are directly interfaced to the base station. Bach base station $100_x$ has the capability of addressing any of the 96 wireless terminals $150_y$, according to a specific embodiment. Each base station $100_x$ may only handle two telephone channels at a time, as the present embodiment provides the capability for up to sixteen simultaneous telephone lines to exchange 120. Of course, each base station $100_x$ may be designed to handle more than two channels at a time, provided it is configured with additional wired communication ports coupled via additional twisted pair cabling to exchange 120.

Since any of wireless terminals $150_y$ may be used with any base station $100_x$, it is necessary to be able to locate a particular terminal $150_y$. The present invention provides for the capability for any individual wireless terminal $150_y$ to be tracked down or located if there is an incoming call at exchange 120 designated for that terminal, as will be discussed in detail below.

In the present embodiment, the communication protocol used between base stations $100_x$ and terminals $150_y$ is the Second-generation Cordless Telephone (CT2) Common Air Interface (CAI) standard, as defined by the European Telecommunications Standards Institute interim standard, ETSI 300-131 (the published standard is incorporated herein by reference). CT2 is a time division duplex/frequency division multiple access (TDD/FDMA) standard for digital cordless telephone control and signalling between a single base station and a single terminal. The present invention uses information used in CT2 for control and signalling between multiple base stations and multiple terminals. In the air, there are 40 radio frequency (RF) channels with 40 carrier frequencies that a terminal may randomly select from a band ranging from about 864.150 to 868.050 Megahertz (MHz). The present system uses a frequency-agile, frequency hopping type of arrangement, so that all 40 frequency channels may be scanned randomly. If a channel is not being used, the channel may be acquired. However, if a channel is in use, other terminals will avoid using that channel until it becomes available.

In the CT2 protocol, each base station has a permanently designated identifier called the Base ID (or "BID"). Each base station also has a unique serial number assigned by the manufacturer. Each wireless terminal has a unique, permanently designated identifier called the Personal ID (or "PID"). Each wireless terminal also has an extension number assigned to it. In a specific embodiment, all base stations in the network share the same unique BID while each base station has a unique serial number, with the combination of the BID and serial number uniquely identifying each individual base station. Each wireless terminal is registered to a base station network, and the BID is stored in the internal memory of the wireless terminal. Accordingly, a wireless terminal may not access the network and the phone lines, unless it has the same BID as the network. Of course, in other embodiments, each base station may be assigned its own unique BID to uniquely identify each base station. In these other embodiments, wireless terminals not having a BID identified on an authorized BID list may be prevented from accessing the network and the phone lines.

Each wireless terminal also has a temporarily designated location ID (or "LID") that indicates the base station to which the terminal is temporarily connected. The temporary association of the PID of a particular terminal with a LID at a particular base station provides an indication of where the particular terminal is located. This information is used in the "last known location database," as discussed below. The LID is used to identify the communication link made between a terminal and a base station on for that particular transaction. For each different transaction or communication link that is established, the LID is different. As part of the CT2 protocol, a wireless terminal is initially registered with a specific base station. CT2 provides for a protocol for an outgoing call from an individual terminal $150_y$ to exchange 120, as well as a handshaking protocol for incoming calls from exchange 120 to an individual terminal $150_y$. The present system makes use of information like PIDs, BIDs, and LIDs used in the CT2 communication protocol to enable the tracking and location of terminals using a common database.

Figure 2:
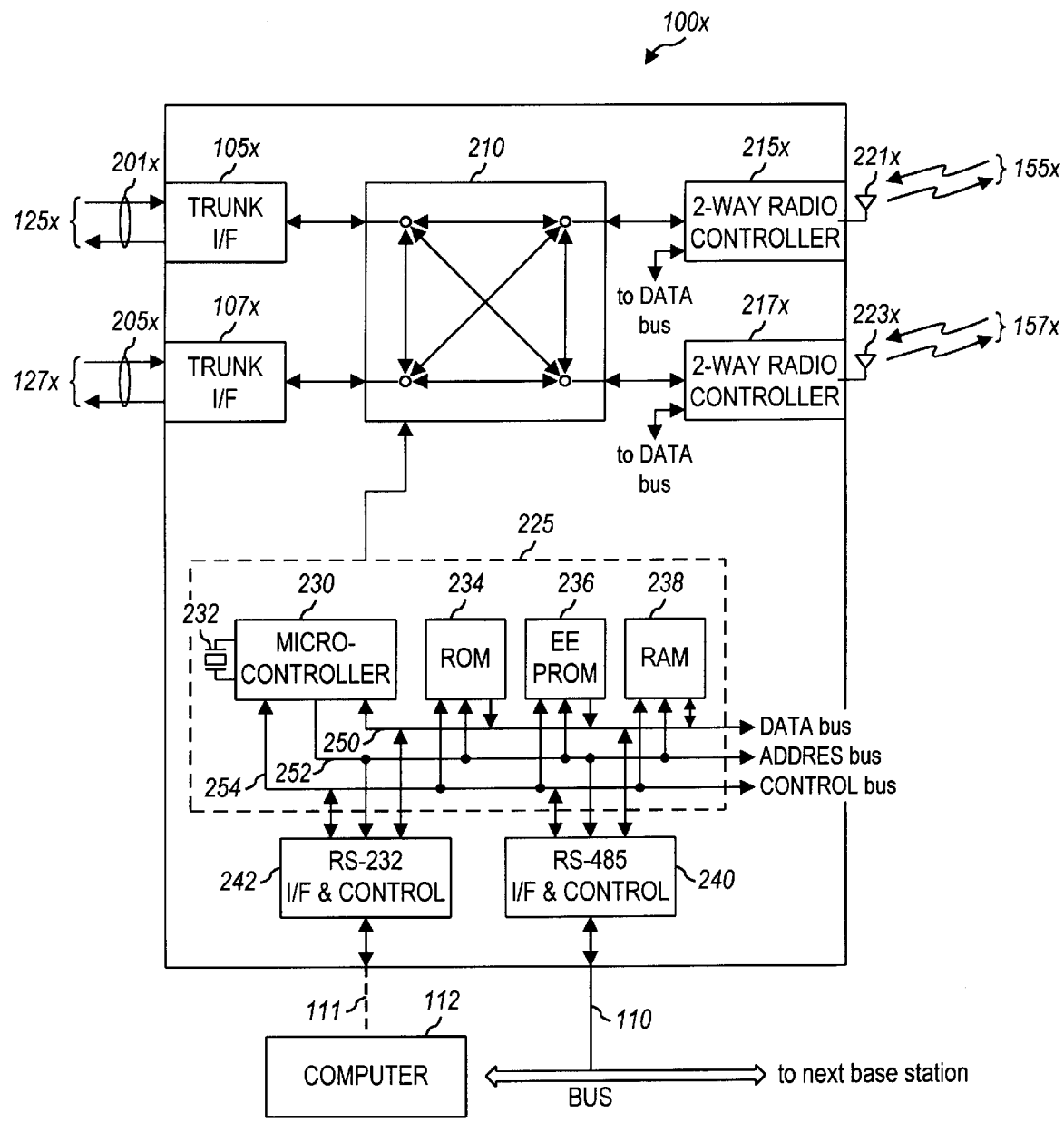
FIG. 2 is a general block diagram of a radio base station according to an embodiment of the invention.

FIG. 2 is a general system block diagram of an exemplary radio base station $100_x$ according to an embodiment of the present invention. It is to be understood that each wireless digital terminal $150_y$ is a CT2-compliant terminal which includes complementary circuitry for processing the frequency division multiplexed signals according to an established protocol, e.g, the CT2 communication protocol. As shown in FIG. 2, an exemplary base station $100_x$ in accordance with the present invention includes trunk interfaces $105_x$ and $107_x$ for communicating signals to exchange 120. Trunk interfaces $105_x$ and $107_x$ provide isolation and the two-wire analog communication between base station $100_x$ and exchange 120 for two telephone lines. Specifically, for communication for one telephone line, trunk interface $105_x$ is coupled to a twisted pair $201_x$ to transmit and receive signals from exchange 120. Similarly, for communication for another telephone line, trunk interface $107_x$ is coupled to a twisted pair $205_x$ to transmit and receive signals from exchange 120. Each trunk interface includes a hybrid line interface circuit, hook switch, and ring detect circuit for signal transmission and isolation. In a specific embodiment, the trunk interfaces may include surge protection, line filters, polarity bridges, hook switches, ring detector circuits with optocouplers, and a speech circuit such as a speech network integrated circuit. Trunk interfaces $105_x$ and $107_x$ are coupled to a switching matrix 210. Switching matrix 210 is also coupled to a two-way radio controller $215_x$ and a two-way radio controller $217_x$. The hardware of switching matrix 210 provides the ability for a telephone line from either trunk interface $105_x$ or $107_x$ to be routed to either two-way radio controller $215_x$ or $217_x$. Exemplary hardware that may be used as switching matrix 210 is a analog switch. In the present embodiment, telephone lines for trunk interface $105_x$ and $107_x$ are dedicated to two-way radio controller $215_x$ and $217_x$, respectively. However, in other embodiments, switching matrix 210 can be provided to route a telephone line from either trunk interface $105_x$ or $107_x$ to either two-way radio controller $215_x$ or $217_x$, using the same hardware and different software. Each two-way radio controller $215_x$ and $217_x$ provides signal processing and modulation of telephone signals between switching matrix 210 and a respective antenna ($221_x$ and $223_x$) in wireless communication with a terminal (not shown). It is understood that base station $100_x$ can transmit and receive signals in accordance with the CT2 protocol and on the frequency channels used by the wireless terminal. Each two-way radio controller includes a CT2 processor that handles the processing of the CT2 protocol and of the audio signals, and a RF module and interface having transmitter and receiver circuits for converting between RF and base band signals that may be processed by the CT2 processor for radio link establishment. The CT2 controller also may be provided with access to an external memory. According to a specific embodiment, exemplary hardware that may be used are a CT2 processor, and RF modules.

Telephone line signals incoming from exchange 120 enter base station $100_x$ via one of the trunk interfaces, and get routed by switching matrix 210 to one of the two-way radio controllers for CT2 transmission via an antenna to a wireless terminal. Similarly, a wireless terminal sends wireless CT2 signals to the antenna of one of the two-way radio controllers for routing by switching matrix 210 to a trunk interface which provides outgoing telephone signals to exchange 120.

As shown in FIG. 2, exemplary base station $100_x$ also includes hardware for accessing polled bus network 110. In particular, base station $100_x$ includes a main controller block 225, which includes a microcontroller 230, an external clock 232 connected to microcontroller 230 for system timing and synchronization, and memory. In the present embodiment, microcontroller 230 is an 8-bit microprocessor. Of course, other microcontrollers or microprocessors may also be used. In the present embodiment, the memory may include a 64 kilobyte (K) read-only memory (ROM) 234, an 8K electrically erasable programmable read-only memory (EEPROM) 236, and a 32K random access memory (RAM) 238. Of course, other embodiments may use other types and sizes of memory, depending for example on the number of telephone lines and wireless terminals in the system. ROM 234 stores software code for the base station call transferring and routing, as well as for master or slave procedures as appropriate. EEPROM 236 stores the local copy of the common database, as discussed below. RAM 238 stores the dynamic variables and parameters needed for system operation. Of course, the local copy of the common database may be stored temporarily or cached in RAM 238 for faster accessibility if needed. In addition, base station $100_x$ includes an RS-485 interface 240 (including associated RS-485 input/output controller) as bus port $103_x$ capable of being connected to other base stations via bus network 110. Base station $100_x$ further includes an RS-232 interface 242 (including associated RS-232 input/output controller) capable of being connected to computer 112 via cable 111. RS-232 interface 242 allows computer 112 to configure base station $100_x$ as the "master" base station or one of the "slave" base stations. Microcontroller 230, ROM 234, EEPROM 236, RAM 238, RS-485 interface 240, and RS-232 interface 242 are interconnected by an 8-bit bi-directional data bus 250, a 16-bit address bus 252, and a control bus 254. Also, switching matrix 210 may be connected to main controller block 225 by control lines 260 to control routing of telephone lines between trunk interfaces and radio controllers, according to some embodiments. Further, each CT2 controller (not shown) in radio controllers $215_x$ and $217_x$ also is connected to microcontroller 230 and the memory via data bus 250. Accordingly, CT2 information used in establishing the radio communication links between base station $100_x$ and wireless terminals $150_y$ may be communicated to microcontroller 230 and stored in memory as needed. The exemplary base station $100_x$ also includes power supply circuitry (not shown), tone signal receiver, and other elements also may be included for additional features.

Polled bus network 110 (FIG. 1) forms a distributed processing architecture having a dynamic distributed database management system. The management system provides for registering wireless digital terminals $150_y$, locating of terminals $150_y$, and allocating communication sessions between wireless digital terminals $150_y$ and base stations $100_x$. Therefore, base stations $100_x$ provide substantial exchange functionality via wireless digital terminals $150_y$. Polled bus network 110 makes use of CT2 information to perform the above functions including locating terminals.

The management system of the present DCT system uses a common database that generally contains all relevant information on each terminal $150_y$, each base station $100_x$, and relationships between different base stations $100_x$ and terminals $150_y$. A copy of the database resides locally in each base station $100_x$ in memory, such as an EEPROM 236.

As part of the management system, a "master" base station controls all updates to the database, and provides updated information as needed to each base station $100_x$. The master base station is one of the base stations in the network that is initially designated and configured by the network manager to assume responsibility as the master base station. The master base station is configured with master software code for operation and control of the networked system, as well as for updating of all copies of the database, and receiving and transferring of calls to and from the exchange. In polled bus network 110, the master base station continuously polls the slave base stations for information, including recent or different registration of wireless terminals, in a daisy-chained order. The slave base stations are not able to send any information to the master base station until polled by the master. All slave base stations are configured with software code for features such as cooperating with the master base station in locating terminals, updating of a local copy of the database guided by the master base station, and receiving and transferring of calls to and from the exchange. Because the base stations have direct telephone interface to the exchange, the code in the base stations allows them to receive calls from the exchange and, when instructed, to transfer the received calls back to the exchange for another extension number. The base station transfers calls in a similar, albeit automated, manner that a user of a digital telephone would be able to transfer calls back to the exchange to send to another extension number by pushing the transfer button followed by that extension number. In a specific embodiment, the code in each base station is stored in local memory such as ROM 234. The master code in the master base station includes modifications and improvements of the standard control code for a CT2 standard controller.

The configuration of the master base station and other base stations occurs when the network is being set up or installed. Configuration, which includes designating one of the base stations as the master base station, is performed by attaching a computer to the designated base station. While the computer is attached to the master base station, the common database stored in the master base station may be set up with initial parameters. System installation and configuration is easily accomplished by simply attaching the computer to the master base station whenever required. After completion of installation and configuration, the computer is simply removed from the master base station for independent operation of the network under the control of the master base station. The polled bus network then operates under the decentralized control of the master base station, which is a node of the network, and the common database may be updated as needed under the control of the master base station. An exemplary computer that may be used for system installation and configuring the network is a conventional 386-based personal computer with at least 4 MB of RAM, 1 MB of disk space, serial port, and installed with Windows 3.1 or higher. Of course, reconfiguration may occur as needed when the network is reset or altered. If the designated master base station experiences any problem that requires repair, the master base station may be removed from the network and a newly designated base station can be configured as the new master base station by attaching the computer for configuration. Additionally, if no message is received by any of the slave base stations from the currently designated master base station for a predetermined interval of time (for example, 1.5 minutes in a specific embodiment), another base station will automatically become the newly designated master base station.

The common database contains various information or parameters including a list of valid PIDs in the network, a list of valid base station identifiers (such as the BID and serial number, in a specific embodiment), and the last known location database. The last known location database is a table of base station identifiers mapped to or associated with PIDs that are used to locate each terminal when required. In CT2 communication protocol, the PID is transmitted to a base station by a terminal as part of the protocol used to establish a synchronized radio communication link. The base station then enters and associates the PID with its base station identifying information in its copy of the common database, then the updated information is sent over the bus network to the master base station for updating to other base stations' copies of the database. The last known location for each handset in the system will be either the base station to which the handset most recently responded to a poll, or the base station that most recently handled an outgoing call from the handset. The default last known location for each handset is the base station with which it was originally registered.

As mentioned above, CT2 provides for a protocol for an outgoing call from an individual terminal $150_y$ to exchange 120. A terminal may originate an outgoing call to exchange 120 via any base station in the network that has a telephone line available and that is within range. When a base station receives an outgoing call from a terminal, the base station, when responding to the master base station's poll, informs the master base station of the new location of the terminal by sending the base station's own identifier as the most recent location of the terminal. The master controller (in the master base station) then updates the last known location database and propagates the new information over the bus network to all other base stations for updating their respective copies of the common database.

As part of the handshaking protocol for outgoing calls to exchange 120 from an individual terminal $150_y$, the terminal transmits a message that includes a BID and terminal PID. A base station receiving the message checks the received BID and terminal PID included in the message against a list of valid BIDs and PIDs from a copy of the common database stored in the base station. If the received BID and PID is not among the valid BIDs and PIDs, then the terminal is not validly registered and the terminal is not permitted access to the wireless system. Therefore, a terminal that is not registered to an authorized base station is denied access to the system, which remains secure. If the received BID and PID are valid, then the base station is validly registered and the terminal is permitted access to the wireless system and the handshaking procedure proceeds. Once the handshaking is completed, the connection between the base station and the terminal is made. The connection, once established, remains until the terminal hangs up or the terminal wanders outside the service region.

Polled bus network 110 locates terminals by using a handshaking protocol of CT2 for incoming calls from exchange 120 to an individual terminal $150_y$. In the present system, terminal location is not determined in advance, but rather in response to an incoming call from exchange 120 to an individual terminal $150_y$. That is, the system does not know or care where an individual terminal may be located until it receives a call for that terminal.

Generally, when an incoming call is received at a base station, the system will first attempt to locate the terminal at two locations: the base station at which the call is received, and the last known location of the terminal. If the terminal is not found at either of these locations within a specified time, a system-wide search occurs and the master base station sends a search request over polled bus network 110 to other base stations. Each base station simultaneously attempts to locate the called terminal. If the terminal responds to any base station, the base station transmits a "found" message back to the master base station in response to the master's poll. Then the call is transferred by the receiving base station to exchange 120 for transfer to that base station responding with the "found" message. Accordingly, the called wireless terminal is located near a base station and the incoming call is switched to the called terminal.

Figure 3:
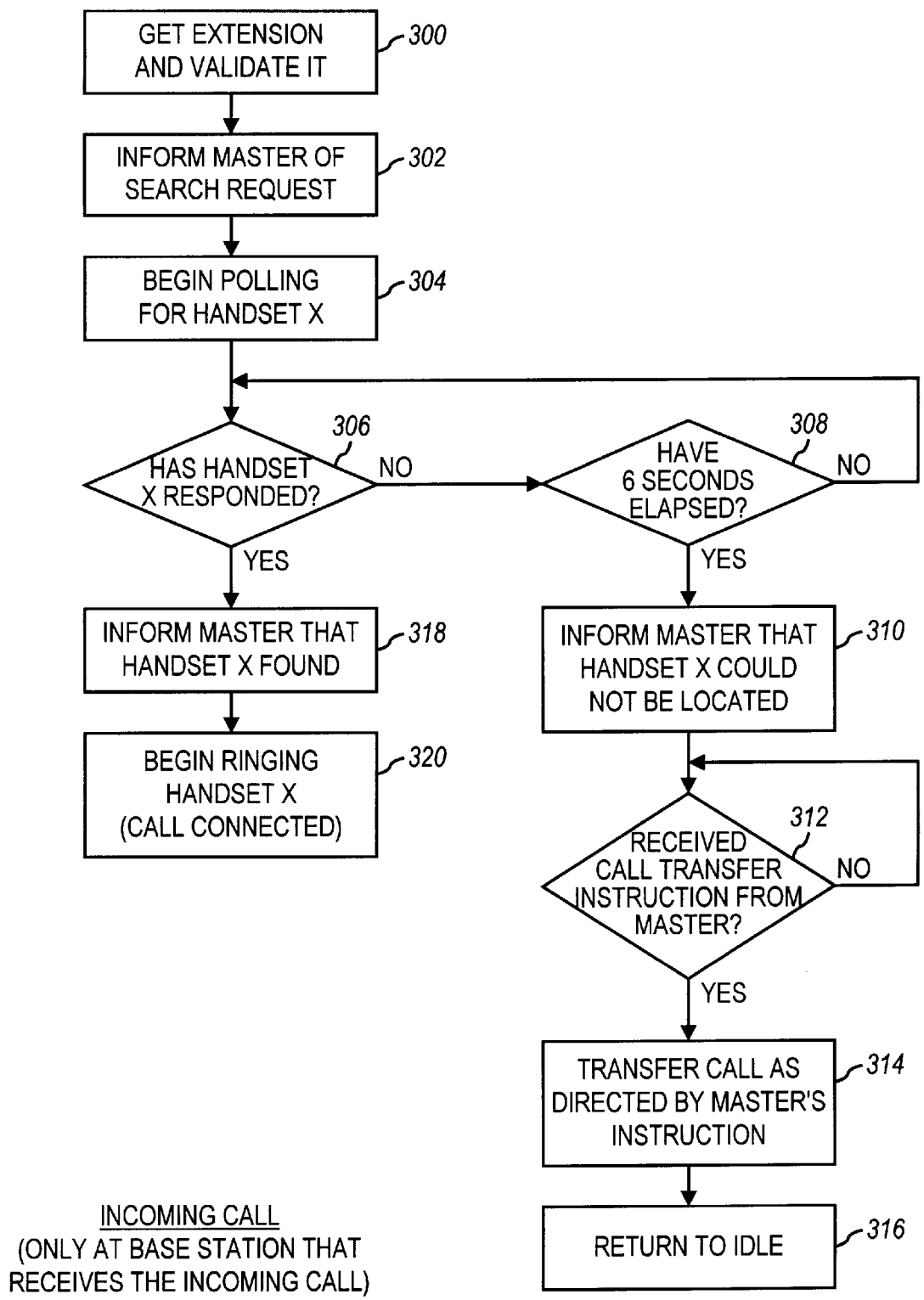
FIG. 3 is a flow chart of a control protocol at slave base stations for locating a DCT handset among a network of base stations according to an embodiment of the invention.
Figure 4:
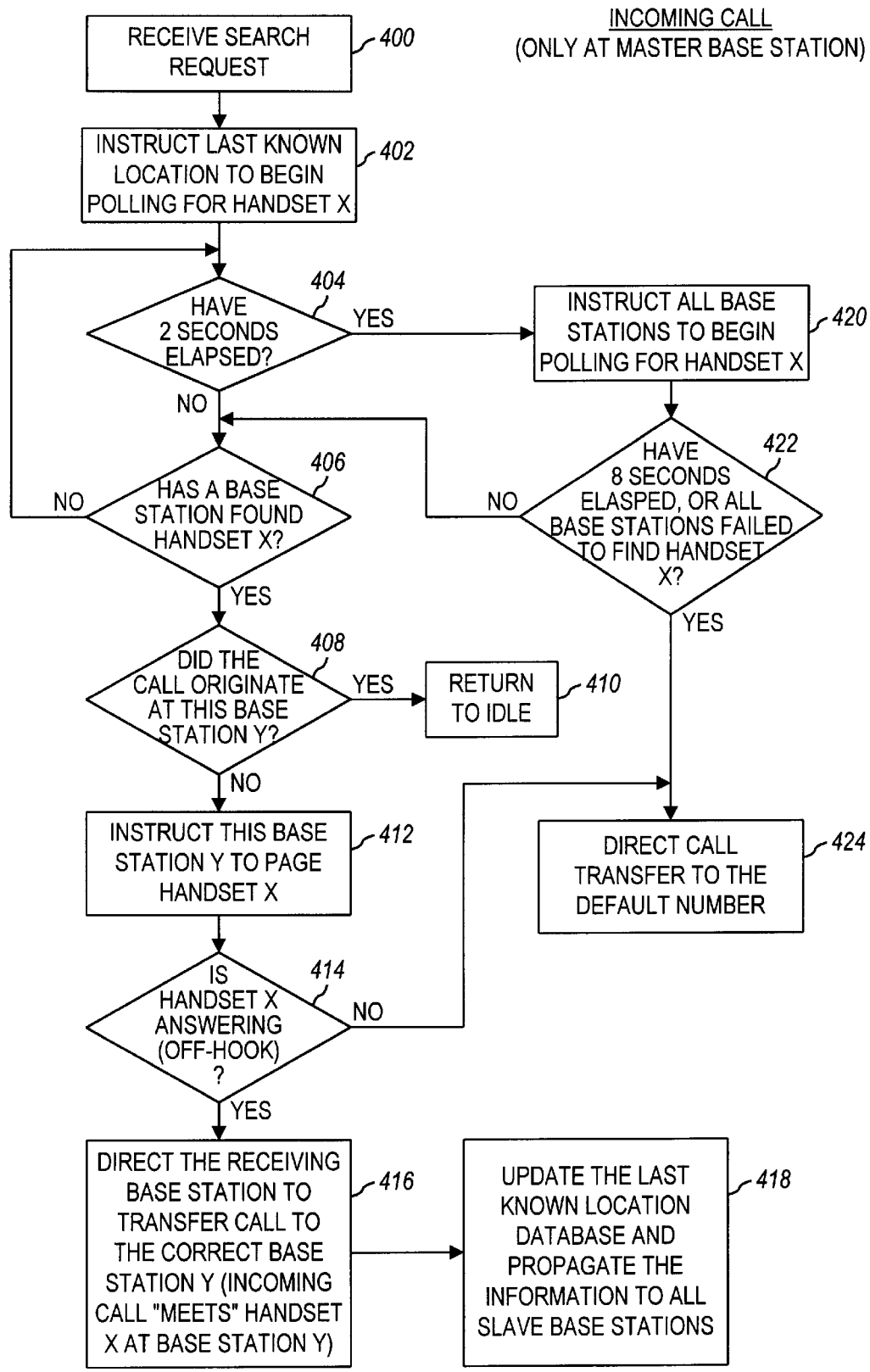
FIG. 4 is a flow chart of a control protocol at a master base station for locating a DCT handset among a network of base stations according to an embodiment of the invention.
Figure 5:
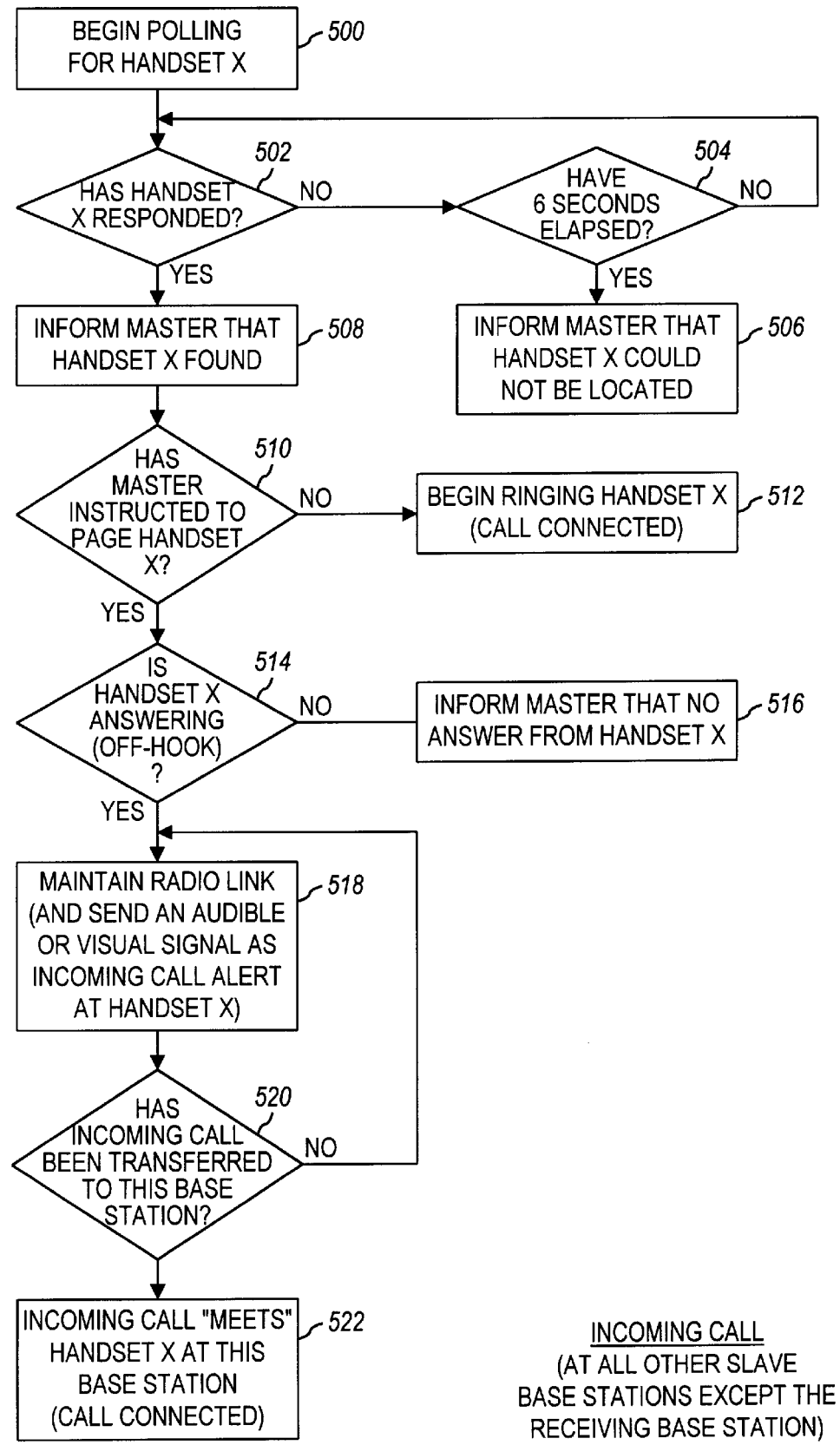
FIG. 5 is a flow diagram of a control protocol at slave base stations, besides the receiving base station, for locating a DCT handset among a network of base stations according to an embodiment of the invention.

FIGS. 3, 4, and 5 are simplified flow charts illustrating the control protocol at the receiving base station, at the master base station, and at the remaining slave base stations, respectively, for locating a terminal among a network of base stations according to an embodiment of the invention.

More specifically, when an incoming call from exchange 120 to a called terminal (also referred to as "handset X" in FIGS. 3–5) is received at a base station (referred to as the "receiving base stations"), the receiving base station gets the extension number of the called terminal and checks the extension against valid extensions stored in its copy of the common database, as seen in step 300 of FIG. 3. The receiving base station then informs the master base station of the request for the called handset X in step 302.

Then in step 304, the receiving base station establishes a radio link to begin polling for the called handset X. The receiving base station waits for handset X to respond to the receiving base station's poll in step 306. Generally, a handset will respond to a base station poll within about 2 seconds if it is in the area and powered on. If the handset does not respond, the receiving base station determines in step 308 whether a specified time period, 6 seconds in a specific embodiment, has elapsed. If the time period elapses, the receiving base station in step 310 informs the master base station that the called handset X could not be located. Then the receiving base station checks for receipt of a call transfer instruction from the master base station, as indicated in step 312. The receiving base station continues checking until such an instruction is received. Once the call transfer instruction is received, the receiving base station in step 314 then transfers the incoming call as directed by the master's instruction. After the call is transferred from the receiving base station to the correct base station, the radio link used for polling at the receiving base station is dropped (and another radio link is established at the correct base station) and the receiving base station thus returns to idle in step 316. If in step 308 the time period has not yet elapsed, the receiving base station continues to wait for the called handset X to respond (step 306). If the called handset X responds to the receiving base station's poll, the receiving base station in step 318 proceeds to inform the master base station that handset X has been located. Then, the receiving base station maintains its radio link and begins ringing the called handset X in step 320 to connect the call.

In addition to the receiving base station trying to locate the called handset X, the system tries to locate handset X at the base station that was the last known location for handset X. As shown in FIG. 4, the master base station in step 400 receives the search request for handset X that was issued by the receiving base station (step 302, FIG. 3). In step 402, the master base station then instructs the specific base station that was the last known location of the terminal to begin polling for handset X.

After step 402, if handset X does not respond within a specified time period, the master base station instructs all slave base stations to begin polling for the called handset X. Specifically, the master base station checks in step 404 whether a specified time period, 2 seconds in a specific embodiment, has elapsed. This time period preferably should be less than the time period (6 seconds in the specific embodiment, as in step 308 of FIG. 3) used by the slave base stations, in order to avoid wasting undue time while waiting for the receiving base station and for the last known location to poll for the called handset X. If the time period has not yet elapsed, the master base station checks in step 406 whether a base station has located handset X. If the master base station has not been informed that a base station has located the called handset X, the master base station continues to check whether the time period has elapsed (step 404). If in step 406 the master base station has been informed that a base station has located the called handset X, then the master base station in step 408 checks whether this base station (the locating base station is referred to as "base station Y" in FIGS. 4 and 5) that found the handset X was the receiving base station, i.e., the base station that received the incoming call. If base station Y is the receiving base station, the master base station returns to an idle state in step 410, as the receiving base station Y will proceed to ring the handset X to connect the call. If base station Y is not the receiving base station, the master base station instructs base station Y to page the called handset X in step 412. Then in step 414, the master base station checks whether handset X is answering the page (i.e., whether the handset is off-hook). If the handset X answers the page of base station Y, then the master base station in step 416 directs the receiving base station to transfer the call to the correct base station Y. The incoming call thus "meets" the handset X at the base station Y. After directing the call transfer, the master base station in step 418 proceeds to update the last known location database with the most recently determined location of handset X, and to propagate the information over the bus network to all slave base stations for updating their copies of the database.

If the specified time period has elapsed as determined in step 404, the master base station in step 420 instructs all the base stations to poll for the called handset X. If a base station cannot poll (because both of its wireless communication links are busy), the poll request is re-sent until either the base station can start polling or the specified time limit is exceeded. Upon receiving the poll request from the master base station, each base station polls the called handset X for a maximum of six seconds. Each base station behaves in a similar manner as the receiving base station, starting with step 304 as discussed above for FIG. 3.

After step 420, according to a specific embodiment, the master base station in step 422 determines whether all base stations have failed to locate the called handset X or whether a predetermined maximum time period, 8 seconds in the specific embodiment, have elapsed. If eight seconds have not yet elapsed, the master base station continues to wait in step 406 to be informed that a base station has located the called handset X. If the master base station has not yet been informed that any of the base stations has located the called handset, the master base station continues to check whether the two-second time period has elapsed (step 404). If eight seconds have elapsed or if all base stations have failed to locate the called handset X, the master base station in step 424 directs the receiving base station to transfer the incoming call to a default extension. Further, the master base station directs the receiving base station to transfer the incoming call to the default extension if the handset X has been found by a base station Y that is not the receiving base station, but the handset X is not answering base station Y's page.

As discussed above, after step 402, if handset X does not respond within a specified time period, the master base station instructs all slave base stations to begin polling for the called handset X. Thus, the receiving base station proceeds by starting at step 304 in FIG. 3. All other slave base stations except the receiving base station proceed by starting at step 500 in FIG. 5. That is, in step 500, each base station establishes a radio link to begin polling for the called handset X. Each base station waits for handset X to respond to its poll in step 502. If the handset does not respond, each base station determines in step 504 whether the specified time period, 6 seconds in a specific embodiment, has elapsed. If the time period has elapsed in step 504, the base station in step 506 informs the master base station that the called handset X could not be located. If in step 504 the time period has not yet elapsed, the base station continues to wait for the called handset X to respond (step 502). If the called handset X responds to the base station's poll, that base station in step 508 proceeds to inform the master base station that handset X has been located. Then in step 510, the base station checks whether the master base station has instructed the base station to page handset X. If the base station has not received an instruction from the master base station to page the called handset X, then the base station maintains its radio link and begins ringing the called handset X in step 512 to connect the call. If the base station has received an instruction from the master base station to page the called handset X, the base station checks whether the called handset X is answering its page (i.e., the handset X is off-hook) in step 514. If the called handset X does not answer the base station's page in step 514, the base station in step 516 informs the master base station that there is no answer from handset X to its page. The master base station then directs the call to be transferred from the receiving base station to a default number (see step 424 in FIG. 4). If the called handset X does answer the base station's page in step 514, the base station in step 518 maintains its radio link and optionally sends an "incoming call alert" that may be an audible or visual (or both) signal that is heard/displayed at handset X. Then in step 520, the base station determines whether the incoming call has been transferred to it from the receiving base station. If the call has not yet been transferred to the base station, then the base station continues to maintain its radio link and alert handset X of an incoming call (step 518). If the incoming call has been transferred to the base station, then in step 522 the call is connected to handset X via the base station. Accordingly, the incoming call "meets" the called handset X at the base station which has located the called handset X.

When an incoming call fails to connect to the called handset X at the first attempt due to the roaming of the handset to a different base station in the radio coverage area, the receiving base station will engage in a radio search (poll) via its own radio unit in a given time. Then, a system search proceeds via the local area network interconnecting all base stations, which engage in respective radio searches via their radio units. Upon locating the handset, the base station that has located the handset starts ringing the handset. Meanwhile, per the master base station's instructions, the receiving base station transfers the incoming call to the base station that has located the handset. Upon the called handset answering the ring, the base station that has located the handset maintains the call electronically by maintaining the radio link and sending the incoming call alert to the handset. Once the call has been successfully forwarded from the receiving base station to the locating base station, the incoming call meets the handset and is connected at the locating base station electronically via system software. Accordingly, the ability of a handset X to "meet" the incoming call at a base station permits efficient location tracking and call hand-off for roaming handsets.

The invention has been explained with reference to specific embodiments. Other embodiments will be apparent to those of ordinary skill in the art. Accordingly, it is not intended that this invention be so limited, except as indicated by the appended claims.

What is claimed is:

1. Apparatus for connecting a particular one of a plurality of wireless terminals used in a nanocellular network formed by a plurality of radio base stations, said base stations coupled to each other by a bus, each of said radio base stations coupled to a local exchange, said apparatus comprising:

means for providing a last known location database in said plurality of base stations, said last known location database containing last known locations of the plurality of wireless terminals, said last known locations identifying base stations where said wireless terminals were last connected;

means for locating, upon receiving an incoming call, said called terminal comprising means for polling for a called terminal using a communication protocol at a receiving base station and at a last known base station, said receiving base station and said last known base station included in said plurality of base stations, said receiving base station receiving the incoming call from a local exchange, and said last known base station being the base station identified as the last known location of the called terminal, and means for polling for the called terminal using the communication protocol at remaining base stations if the receiving base station and the last known base station do not inform a master base station within a specified time period that the called terminal has been located, said master base station being responsible for updating the last known location database;

means for transferring the incoming call from said receiving base station to a base station that locates said called terminal; and means for updating the last known database at said master base station when a base station that is not the last known base station informs the master base station that the called terminal has been located.

2. The apparatus of claim 1 further comprising: means for configuring the plurality of vase stations.

3. The apparatus of claim 2 further comprising:

means for informing the master base station of a search request for the called terminal, said search request being initiated upon receiving the incoming call;

means for instructing the last known base station to begin polling for the called terminal; and means for instructing said remaining base stations to begin polling for the called terminal if the called terminal is not located within a specified time period.

4. The apparatus of claim 3 further comprising:

means for instructing said one of the remaining base stations to page the called terminal if the called terminal does not respond to its poll; and means for instructing the receiving base station to transfer the incoming call to said one of the remaining base stations, said one electronically maintaining the incoming call until the called terminal answers the page and the incoming call is connected.

5. The apparatus of claim 1 further comprising: means for checking the validity of the called terminal.

6. A method of connecting a particular one of a plurality of wireless terminals used in a nanocellular network formed by a plurality of radio base stations, each of said radio base stations coupled to a local exchange, said method comprising providing a last known location database in said plurality of base stations, said last known location database containing last known locations of the plurality of wireless terminals, said last known locations identifying base stations where said wireless terminals were last connected;

locating, upon receiving an incoming call, said called terminal comprising polling for a called terminal using a communication protocol at a receiving base station and at a last known base station, said receiving base station and said last known base station included in said plurality of base stations, said receiving base station receiving the incoming call from a local exchange, and said last known base station being the base station identified as the last known location of the called terminal, and polling for the called terminal using the communication protocol at remaining base stations if the receiving base station and the last known base station do not inform a master base station within a specified time period that the called terminal has been located, said master base station being responsible for updating the last known location database;

transferring the incoming call from said receiving base station to a base station that locates said called terminal; and updating the last known database at said master base station when a base station that is not the last known base station informs the master base station that the called terminal has been located.

7. The method of claim 6 further comprising:

configuring the plurality of base stations using a computer temporarily attached to said master base station of the network.

8. The method of claim 7 further comprising:

informing the master base station of a search request for the called terminal, said search request being initiated upon receiving the incoming call;

instructing the last known base station to begin polling for the called terminal; and instructing said remaining base stations to begin polling for the called terminal if the called terminal is not located within a specified time period.

9. The method of claim 8 further comprising:

instructing said one of the remaining base stations to page the called terminal if the called terminal does not respond to its poll; and instructing the receiving base station to transfer the incoming call to said one of the remaining base stations, said one electronically maintaining the incoming call until the called terminal answers the page and the incoming call is connected.

10. The method of claim 9 wherein said last known location database uses personal IDs and base station IDs used in the CT2 protocol for establishing a synchronized radio link.

11. The method of claim 6 further comprising: checking the validity of the called terminal.

12. The method of claim 6 wherein said communication protocol comprises CT2.

13. The method of claim 12 wherein said memory comprises a random access memory (RAM).

14. The method of claim 6 wherein said last known database is stored in a memory in each of said plurality of base station.

15. A method of locating a wireless terminal in a network formed by a plurality of radio base stations, said method comprising:

receiving an incoming call for a called terminal at a receiving base station;

polling, upon receiving said incoming call, for said called terminal at said receiving base station;

polling, substantially concurrent with said polling at said receiving base station, for said called terminal at a last known base station;

polling, after a first predetermined time period, for said called terminal at remaining base stations in the network, wherein said last known base station is the base station last connected with said called terminal, said last known base station being identified within a database.

16. The method of claim 15 further comprising:

updating the database when a base station that is not the last known base station informs a master base station that the called terminal has been located.

17. The method of claim 15 further comprising:

terminating said polling by said receiving base station and said last known base station after a second predetermined time period if said called terminal has not responded to said polling by said receiving and last known base stations.

18. The method of claim 15 further comprising:

terminating said polling by said remaining base stations after a third predetermined time period if said called terminal has not responded to said polling by said remaining base stations.

* * * * *